United States Patent [19]
Tanimura et al.

[11] Patent Number: 6,086,772
[45] Date of Patent: Jul. 11, 2000

[54] METHOD AND APPARATUS FOR PREVENTING BIOFOULING IN COOLING WATER SYSTEM

[75] Inventors: Yasuhiro Tanimura; Junji Hirotsuji; Shigeki Nakayama; Hisao Amitani; Hiroshi Yuge; Tateki Ozawa, all of Tokyo, Japan

[73] Assignee: Mitsubishi Denki Kabushiki Kaisha, Tokyo, Japan

[21] Appl. No.: 09/111,182

[22] Filed: Jul. 8, 1998

[30] Foreign Application Priority Data

Jul. 24, 1997 [JP] Japan ................................. 9-198434

[51] Int. Cl.⁷ ........................................ C02F 1/78
[52] U.S. Cl. ..................... 210/760; 210/96.1; 210/120; 210/177; 95/138
[58] Field of Search ................... 210/96.1, 120, 210/177, 192, 205, 748, 760, 764; 95/900, 138; 96/224; 261/DIG. 11, DIG. 46

[56] References Cited

U.S. PATENT DOCUMENTS

| | | | |
|---|---|---|---|
| 4,252,751 | 2/1981 | Shito | 261/DIG. 11 |
| 4,430,306 | 2/1984 | Namba et al. | 422/292 |
| 4,453,953 | 6/1984 | Tanaka et al. | 55/387 |
| 4,462,965 | 7/1984 | Azuma et al. | 210/760 |
| 4,552,659 | 11/1985 | Tabata et al. | 210/177 |
| 5,053,140 | 10/1991 | Hurst | 210/704 |
| 5,145,585 | 9/1992 | Coke | 210/760 |
| 5,585,003 | 12/1996 | Van Newenhizen | 210/748 |

FOREIGN PATENT DOCUMENTS

| | | |
|---|---|---|
| 0 567 860 | 11/1993 | European Pat. Off. . |
| 52-3595 | 1/1977 | Japan . |
| 55-61984 | 5/1980 | Japan . |

OTHER PUBLICATIONS

Patent Abstracts of Japan, vol. 007, No. 289 (C–202), Dec. 23, 1983, JP 58 166980, Oct. 3, 1983.

Paul R. Puckorius, Ozone Science & Engineering, vol. 15, pp. 81–93, "Ozone Use in Cooling Tower Systems–Current Guidelines–Where it Works", 1993.

Derwent Abstracts, vol. 003, No. 079 (C–051), Jul. 6, 1979, AN 79–46100, JP 54 056952, May 8, 1979.

Derwent Abstracts, AN 92–231341, JP 04 156994, May 29, 1992.

Derwent Abstracts, AN 77–46142, JP 52 061165, May 20, 1977.

Primary Examiner—David A. Simmons
Assistant Examiner—Frank M. Lawrence
Attorney, Agent, or Firm—Oblon, Spivak, McClelland, Maier & Neustadt, P.C.

[57] ABSTRACT

A method for preventing biofouling in a cooling water system wherein ozone of high density is intermittently injected into a circulating line of a cooling water system in which cooling water is made to circulate in a closed system which includes a cooling tower and a heat exchanger. There is further disclosed an apparatus for preventing biofouling in a cooling water system, comprising an ozone generator for producing ozone, an ozone reservoir for temporarily storing the produced ozone, and an ozone injector for injecting the stored ozone into a circulating line of a cooling water system. Biofouling can be economically and reliably prevented.

6 Claims, 6 Drawing Sheets

METHOD AND APPARATUS FOR PREVENTING BIOFOULING IN COOLING WATER SYSTEM

BACKGROUND OF THE INVENTION

The present invention relates to a method and an apparatus for preventing biofouling in a cooling water system. More particularly, it relates to a biofouling preventing method for a cooling water system for preventing biofoulings in a closed cooling water system having a cooling tower, and to an apparatus therefor.

Water is used in large quantities in many kinds of industry and other fields for many purposes, wherein it is mostly used as cooling water. While there are known transient cooling methods in which cooling water heated through heat exchange or the like is expended, a method in which water is circularly used by employing a cooling tower and decreasing the water temperature utilizing temperature differences between air and water or vaporization is used in cases where available water resource is limited. It is in many cases possible to lower the water temperature by approximately 1° C. with a water consumption of approximately 2% in such a circulation method, which might differ depending on various conditions. In view of effective utilization of water resources, such a cooling method by means of a closed cooling water system is quite important.

Figure 5:
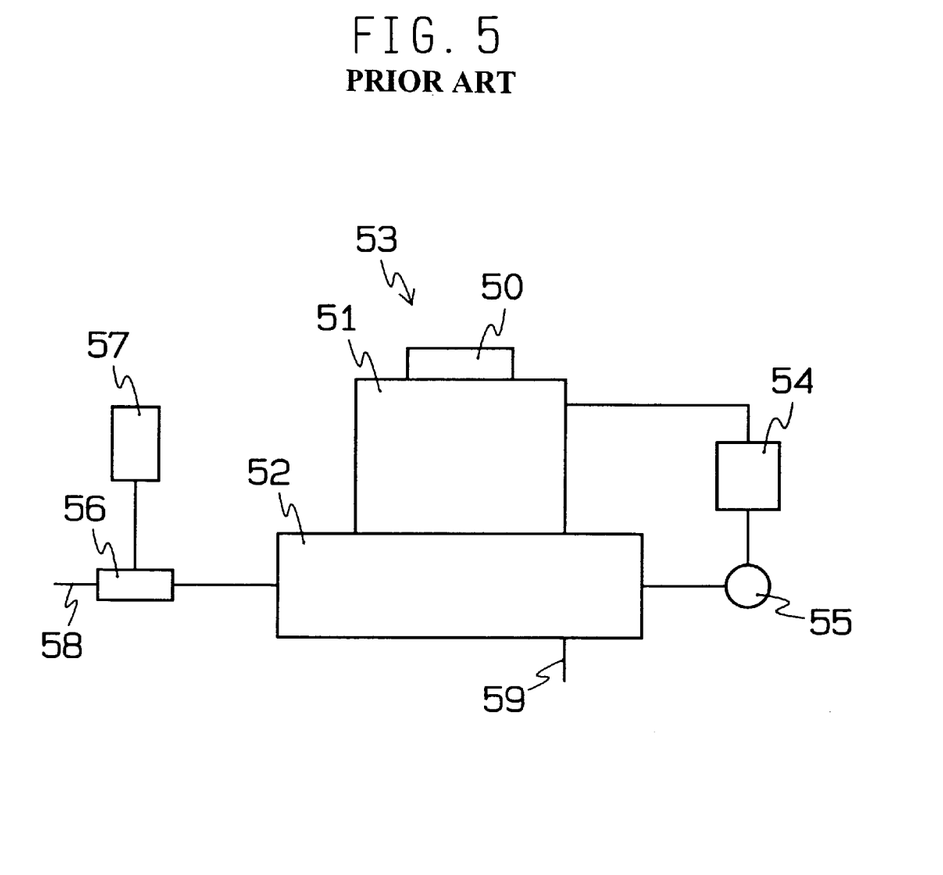
FIG. 5 is a diagram showing an arrangement of a conventional apparatus for preventing biofouling in a cooling water system.

Such a biofouling preventing apparatus for a cooling water system employing a typical closed cooling water system with a cooling tower is known to comprise, for instance, the following components as shown in FIG. 5: a cooling tower 53 including a ventilating fan (fan) 50, fillers 51, and a reservoir 52; a heat exchanger 54; a circulating pump for cooling water 55; an injector for agents 56; a reservoir for agents 57; a fresh water supplying line for supply 58; and a drawing line for circulating water 59.

In such a biofouling preventing apparatus for a cooling water system, the cooling water circulates through the heat exchanger 54 and the cooling tower 53 by means of the circulating pump 55. The water which has been heated by the heat exchanger 54 is lowered in temperature by being forced to come in contact with an air flow from the ventilation fan 50 while it is dispersed to the filling material in the fillers 51 through a dispersing device at a top portion of the cooling tower whereupon it forms a film of water at the wall surface of the filling material and drops. The water then passes through the reservoir 52 and is again sent to the heat exchanger 54, and this process is repeatedly performed thereafter. Since the water is essentially forced to evaporate and is dispersed in the cooling tower 53, fresh water corresponding to at least this loss amount is supplied from the line 58. Further, in order to prevent accumulation of substances such as minerals in the circulating water which do not evaporate, a part of the circulating water is drawn from the line 59 as drawing water. Therefore, it is necessary to supply fresh water to compensate for this amount.

As circulating water comes into contact with a large quantity of air in this manner, various microorganisms included in the air are mingled into the system which reside, multiply and are stored therein. Such microorganisms adhere to filling materials of the cooling tower, the heat exchanger surface, or other channel walls to form a biofilm and might cause plugging, decreases in heat exchange efficiency and corrosion of composing materials. In addition, there exists the danger that virus, a representative example of which is Legionella Pneumophila, might be discharged into the air through the ventilation fan of the cooling tower.

Such hazards are generally called a biofouling. In order to prevent such a biofouling, bactericides are injected into the circulating water. Mainly used bactericides are chlorinous agents. In this case a bactericide which is input into the injector 56 through the reservoir 57 generally dissolves into fresh water and is continuously or intermittently (in an almost continuous manner) injected to the cooling tower 53, as shown in FIG. 5.

When using such bactericides such as chlorinous agents, the density of the bactericide in the cooling water needs to be maintained at a high level to obtain sufficient effects. This, in turn, presents drawbacks such as corrosion of composing materials of the cooling water system, influences to peripheral environments of droplets in the cooling tower, and environmental pollution due to residual bactericide in the drawing drainage or byproducts of the bactericide such as chlorinated hydrocarbon. Further, since chloride is accumulated in the circulating water, the amount of drawing water needs to be increased to prevent the accumulation.

Figure 6:
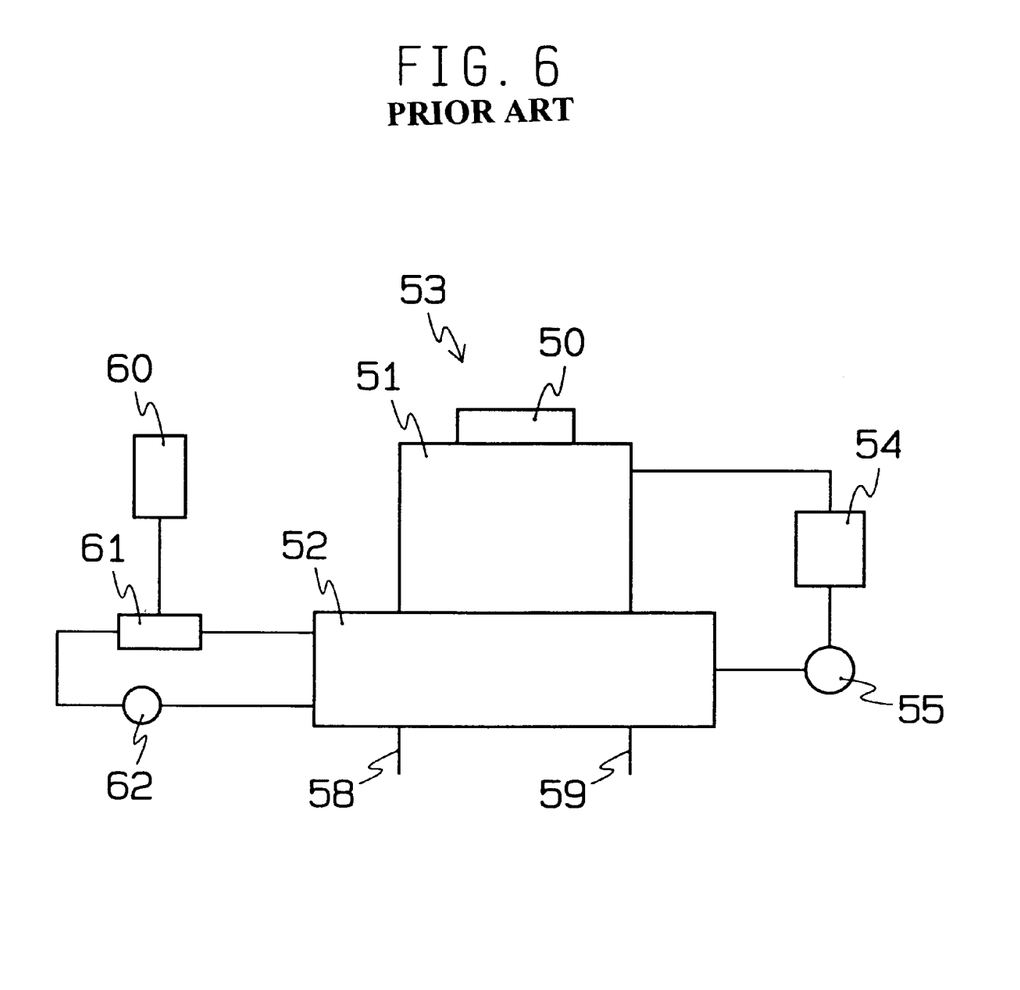
FIG. 6 is a diagram showing an arrangement of another conventional apparatus for preventing biofouling in a cooling water system.

On the other hand, in some countries such as in the U.S.A., there are cases in which ozone is employed instead of chlorine. As compared to chlorinous agents, ozone is decomposed or consumed in water in a relatively short time. For instance, an ozone injection method might be employed instead of the above agent injecting method, as shown in FIG. 6. In FIG. 6, numeral 60 denotes an ozone generator, 61 an ozone injector such as ejector, and 62 a pump for drawing circulating water. The cooling water in the reservoir 52 of the cooling tower 53 is drawn by the pump 62, a vaporized ozone-containing gas generated by the ozone generator 60 is dissolved in the cooling water drawn by the injector 61 and returned to the reservoir 52. The reason why a different injection method is taken than for chlorinous agents is that ozone is unstable and highly reactive, whereby it is smoothly decomposed and vanishes in water. Generally, it is continuously injected. While the amount of injection of ozone depends on quality of cooling water, an amount of 1.7 to 80 g per day with respect to 1 t of held cooling water is required (Federal Technical Alerts, U.S. Department of Energy, A. E. Pryor and M. Fisher, Ozone Science & Engineering 16(6), 505–536 (1994)).

When employing ozone, a suitable amount of injected ozone solves many problems which arise when employing bactericides such as chlorinous agents. However, drawbacks are presented in that costs for the ozone generator and for efficiently generating ozone are relatively high and in that the dissolved ozone density in the cooling water is limited since ozone in the water is easily diffused into air so that ozone can not be injected by an amount as required for presenting sufficient effects. These drawbacks result in higher costs for facilities and maintenance.

It might be considered to connect, for instance, a microorganism removing apparatus which is employed in cooling water piping for power stations (refer to Japanese Examined Patent Publication No. 2559/1984) instead of the above-described apparatus of the ozone injecting method. However, by employing this removing apparatus for injecting ozone into cooling water which is drawn by the pump 62, it will be made to flow out of the line 59, and thus will not be economical and not suitable for efficiently preventing biofoulings.

The present invention has been made in view of the above circumstances, and it is an object of the present invention to provide a biofouling preventing method for a cooling water system and an apparatus therefor with which biofoulings can be reliably prevented.

SUMMARY OF THE INVENTION

The method for preventing biofouling in a cooling water system according to a first invention is characterized in that ozone of high density is intermittently injected into a circulating line of a cooling water system in which cooling water is made to circulate in a closed system which includes a cooling tower and a heat exchanger.

The method for preventing biofouling in a cooling water system according to a second invention is characterized in that an interval and time for injecting ozone are not more than twice a day and not more than 5 minutes, respectively, and in that an average value of dissolved ozone density in the cooling water of the cooling water system during injection is not less than approximately 0.1 mg/liter.

The apparatus for preventing biofouling in a cooling water system according to a third invention is characterized in that it comprises an ozone generator for producing ozone from raw material gas, an ozone reservoir for temporarily storing the produced ozone, and an ozone injector for injecting the stored ozone into a circulating line of a cooling water system in which cooling water is made to circulate in a closed system which includes a cooling tower and a heat exchanger.

The apparatus for preventing biofouling in a cooling water system according to a fourth invention is characterized in that the ozone reservoir comprises an adsorption/desorption device for adsorbing and storing ozone from ozonized oxygen and further desorbing the ozone, and a circulating blower for returning oxygen which has been adsorbed of ozone by the adsorption/desorption device to the ozone generator.

The apparatus for preventing biofouling in a cooling water system according to a fifth invention is characterized in that it includes a ventilation amount control means for terminating or decelerating forced ventilation of the cooling tower during a period in which ozone is injected and in which the dissolved ozone density in the cooling water is not less than a predetermined value.

The apparatus for preventing biofouling in a cooling water system according to a sixth invention is characterized in that it includes an ultraviolet light irradiating device for irradiating ultraviolet light to the exhausted air from the cooling tower during a period in which ozone is injected and in which the dissolved ozone density in the cooling water is not less than a predetermined value.

DETAILED DESCRIPTION OF THE INVENTION

Embodiment 1

Figure 1:
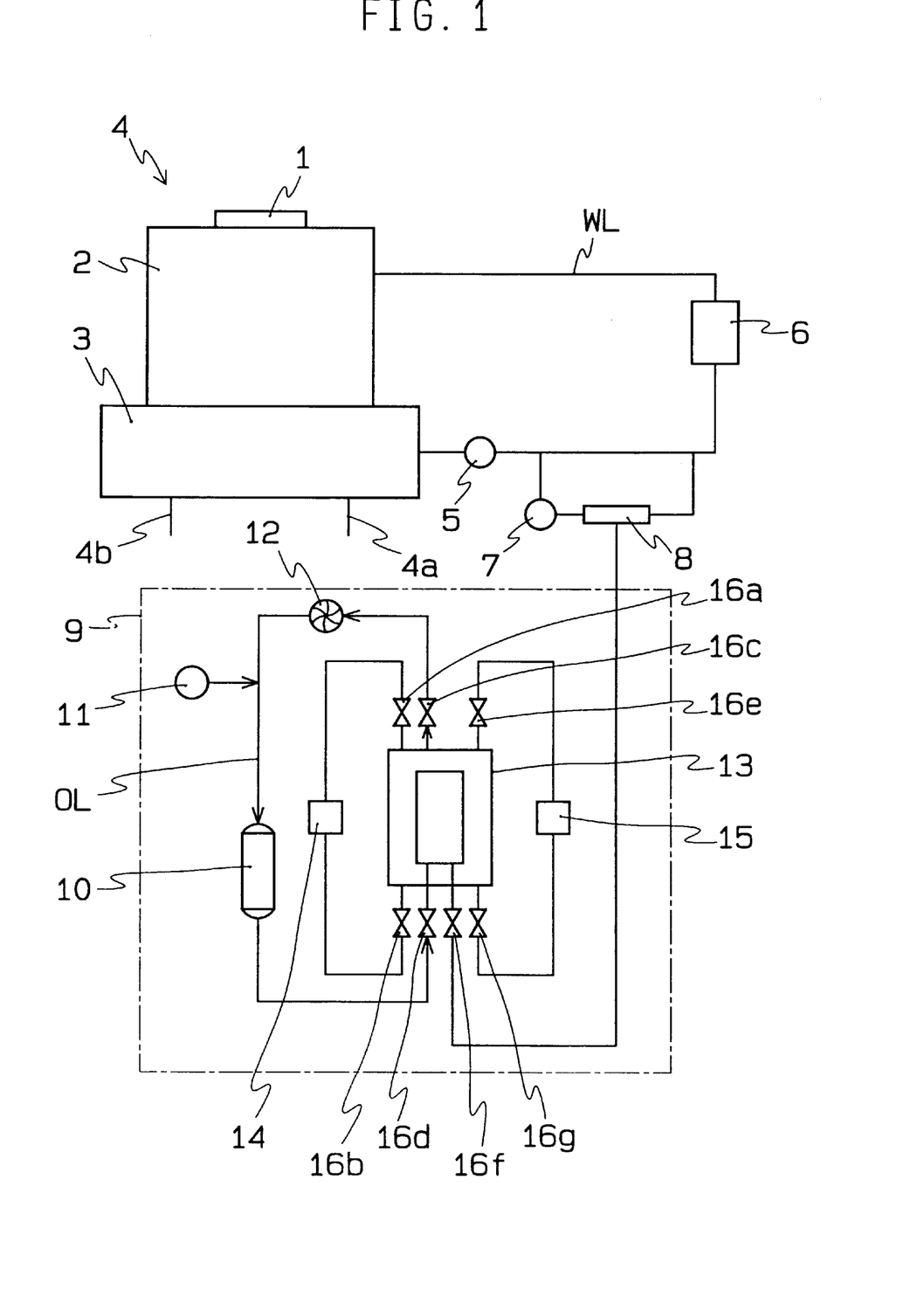
FIG. 1 is a diagram showing an arrangement of an apparatus for preventing biofouling in a cooling water system according to Embodiment 1 of the present invention.

FIG. 1 is a diagram showing an arrangement of an apparatus for preventing biofouling in a cooling water system (a biofouling preventing apparatus for a cooling water system) according to Embodiment 1 of the present invention. Such a biofouling preventing apparatus comprises, as shown in FIG. 1, a cooling tower 4 including a ventilating fan 1, fillers 2 and a reservoir 3; a circulating pump 5 and a heat exchanger 6 which are connected to a circulating line WL which makes cooling water circulate to the cooling tower 4 in a closed system; a branching pump 7 and an ozone injector 8 which are connected to a branching line connected to the circulating line WL; and an ozone reservoir 9 connected to the ozone injector 8. The ozone reservoir 9 is composed of an ozone generator 10 for generating ozone, an oxygen supply source 11, a circulating blower 12, an adsorption/desorption device (tower) 13 for temporarily storing the produced ozone, a cooling source 14 for cooling the adsorption/desorption tower 13, a heating source 15 for heating the adsorption/desorption tower 13, and a group of switch valves (solenoid valves) 16a to 16g. It should be noted that 4a denotes a fresh water supplying line 58 for supply and 4b a drawing line for the circulating water. Further, an ejector which takes out ozone from the adsorption/desorption tower 13 by depressing for suction might be employed as the ozone injector 8. The adsorption/desorption tower 13 is of double cylinder type wherein an inner cylinder is filled with an adsorbent and an outer cylinder is filled with a thermal medium. It is preferable to select an adsorbent having a low decomposing rate when it comes into contact with ozone. For example, silica gel, activated alumina or porous materials impregnated with fluorocarbon can be employed. On the other hand, ethylene glycol or alcohol group might be used as the thermal medium. It should be noted that the circulating blower 12, ozone generator 10 and adsorption/desorption tower 13 constitute, in this order, a single circulating system OL.

Operations of the apparatus will now be explained. There are three operations in total, namely ozone adsorbing operation, ozone desorbing operation, and living things removal operation.

The adsorbing operation will first be explained. Oxygen is supplied by the oxygen supply source 11 so that the pressure in the circulating system OL is always constant. When oxygen is made to flow in the circulating system OL by the circulating blower 12 while the switch valves 16c and 16d are in an opened condition, a part of the oxygen is converted into ozone through silent discharge to generate an ozonized oxygen while passing through the discharge space of the ozone generator 10, and the an ozonized oxygen is then transferred to the adsorption/desorption tower 13. The adsorbent in the adsorption/desorption tower 13 selectively adsorbs ozone, and the remaining oxygen is returned to the circulating blower 12 through the switch valve 16c. Oxygen which has been consumed as ozone is supplemented through the oxygen supply source 11. Since the adsorbent assumes a property that adsorption capacity of ozone increases if the adsorbent is cooled more, the cooling temperature is generally maintained by the cooling source 14 to not more than −40° C. Further, the higher the pressure in the circulating system OL becomes, the more efficiently ozone can be stored. However, in view of ozone generating efficiency and ozone storing efficiency, an excessive increase of pressure in the circulating system OL results in an increase in consumption of electricity at the time of storage so that it is desirable to maintain a pressure of about 5 kg/cm²G in maximum.

When the adsorbent in the adsorption/desorption tower 13 has adsorbed ozone to approach the ozone saturation adsorption amount, desorbing (separating) operation of ozone is performed. In the desorbing operation, operations of the ozone generator 10, circulating blower 12 and cooling source 14 are terminated and the switch valves 16a to 16d are closed. Thereafter, the heating source 15 and branching pump 7 start their operation and switch valves 16e to 16g are opened. At this time, temperature of the adsorbent is raised by applying heat of not less than 10° C. through the heating source 15 so that ozone which has been adsorbed by the adsorbent can easily be desorbed therefrom in a few minutes. By depressing to suck ozone in the adsorption/desorption tower 13 at a stroke by means of the ejector 8, ozone is intermittently injected into a branching line provided amid a piping extending from the reservoir 3 of the cooling tower 4 to the heat exchanger 6. In this way, ozone is supplied to the filling material in the fillers 2 of the cooling tower 4, to the surface of the heat exchanger 6 and to other channel walls so that living things adhering to their surfaces are removed. The achieved pressure in the adsorption/desorption tower 13 by the depressing for suction is approximately 0.1 kg/cm² (absolute pressure). When the desorbing period is completed in this way, the process returns to the initial adsorbing operation and is continuously repeated.

Since the dissolved ozone density in the circulating flow is required to be more than a specified density, it is desirable that the density of ozone to be injected is high. According to the present embodiment, a large quantity ozone of high density can be intermittently supplied by an ozone generator of small capacity. Since ozone of low density with which only a small living things removing effect can be achieved is also injected when the injection interval and time are long, an injection time of 1 to 5 minutes is sufficient. Although an increase in number of injection somewhat increases the living things removing effect, the difference in living things removing effect between 1 and 10 times is small. Since an increase in number of injection requires an ozone generator of larger capacity and its economical effect is decreased thereby, it is sufficient to set the injecting interval to once or twice a day.

The dissolved ozone density in the cooling water system during injection is at least 0.1 mg/liter in average, and preferably 0.2 mg/liter in order to reliably perform adhesion of living things on the filling material surface in the fillers 2 of the cooling tower 4 which is most remote from the ozone injecting portion. The higher the dissolved ozone density is, the shorter the injection time might be made.

A cooling water system having 100 m³ of cooling water will be concretely explained. The amount of circulating water in this case is set to 1635 m³ per day. By injecting 2 to 5 g/m³ of ozone in average twice a day for 5 minutes, biofoulings in the system can be prevented. In this case, the amount of injected ozone is 23 to 57 g per day. It should be noted that the required amount of ozone according to the prior art is 170 to 8,000 g per day. Further, while the capacity of the ozone generator according to the prior art is 7 to 333 g/hour, that of the intermittent ozone generator according to the present embodiment which is of adsorption/storage type employing silica gel is 12 to 2.9 g/hour (in the case where the ozone generator is operated 20 hours a day for storing ozone) and thus of very small capacity. When the amount of circulating water is increased to more than the above value, the amount of required ozone simultaneously increases; however, it is highly economical compared to the prior art.

By injecting ozone of high density into cooling water in this manner, it is possible to perform sterilization of adhering living things in quite a short time whereby a short time intermittent injection is enabled.

While an ejector that is divergently driven with a branching pump 7 is employed as the ozone injector 8 in this embodiment, it is also possible to omit the branching line and to directly inject into the circulating flow. It should be noted that the solution injector 8 is not limited to an ejector. Further, while the point from which ozone is injected is set to be between the reservoir and the heat exchanger in this embodiment, it might be somewhere else, depending on the amount of stored circulating water or the length of the piping. There might also be a plurality of points from which ozone is injected as long as they are within the circulating line WL, depending on condition of pollution in the system. For example, the filling material of the cooling tower and the heat exchanger surface can be efficiently removed of living things by injecting ozone into piping which lead to and from the heat exchanger, whereby the biofouling preventing performance can be further increased.

While it has been explained for a case, in this embodiment, in which ozone is adsorbed by an adsorbent such as silica gel, stored, and intermittently injected, it is also possible to compress ozone in a gaseous state for storage. With this arrangement, the number of parts constituting the ozone storage device can be decreased for simplification of the device. However, a gas compressed storage method presents a drawback that ozone can not be injected at a density which exceeds the density at which it has been supplied to the ozone storage device.

Embodiment 2

Figure 2:
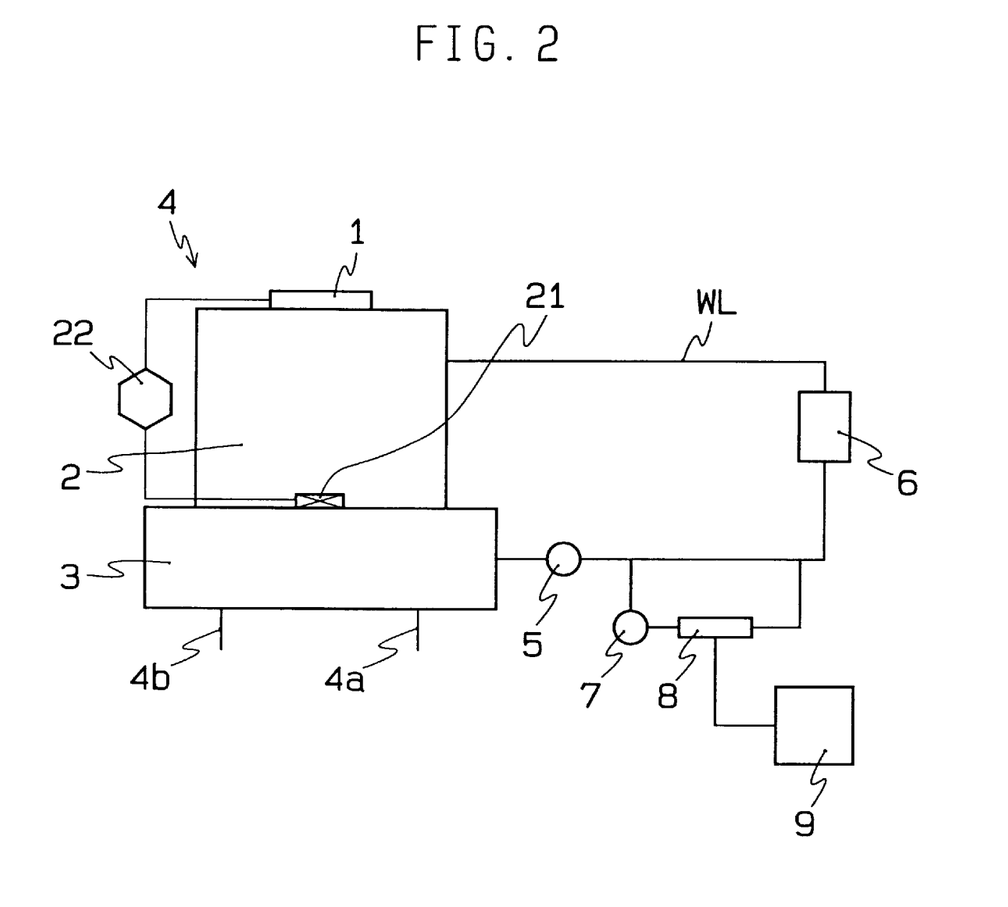
FIG. 2 is a diagram showing an arrangement of an apparatus for preventing biofouling in a cooling water system according to Embodiment 2 of the present invention.

FIG. 2 is a diagram showing an arrangement of a biofouling preventing apparatus of a cooling water system according to Embodiment 2 of the present invention, and since numerals which are identical with those of the previous embodiment indicate identical or equivalent portions, explanations thereof will be omitted.

Numeral 21 denotes an ozone densitometer for measuring an ozone density in cooling water which has passed the fillers 2 of the cooling tower 4, and 22 denotes a control device for controlling driving of the ventilating fan 1 of the cooling tower 4 upon receipt of a signal from the ozone densitometer 21.

Operations will now be explained. There are three operations in total, namely ozone adsorbing operation, ozone desorbing operation, and biofouling removal operation. However, since the ozone adsorbing operation and the ozone desorbing operation are identical with those of Embodiment 1, explanations thereof will be omitted.

When the stored ozone is intermittently injected to a branching line provided amid a piping extending from the reservoir 3 of the cooling tower 4 to the heat exchanger 6 in the ozone reservoir 9 (refer to FIG. 1), ozone is supplied to the filling material of the fillers 2, heat exchanger surface and other channel walls, whereby removal of living things adhering to their surfaces is performed. At this time, the ozone density in the cooling water is monitored by the ozone densitometer 21 at an outlet of the fillers 2 of the cooling tower 4. When the ozone density is not less than a predetermined value, a signal is sent from the ozone densitometer 21 to the control device 22, and the control device 22 sends a signal for terminating or decelerating forced ventilation by the ventilation fan 1 in the cooling tower 4.

The ozone density in the cooling water at the time of ozone injection is at least 0.1 to 0.2 mg/liter. Since ozone is a gas which is relatively hard to dissolve in water, ozone is diffused from the circulating water into air. It is relatively seldom that ozone which is also unstable in air causes any problems; however, diffusion into air shall still be prevented. By terminating or decelerating ventilation from the ventilating fan at the time of injecting ozone, properties of ozone that it is smoothly consumed and decomposed in water might be utilized to minimize diffusion. With this arrangement, it is also possible to decrease the amount of ozone diffusing into air and ozone can be effectively utilized. It should be noted that termination or deceleration of forced ventilation hardly causes problems since the time thereof is short.

While it has been shown a case in this embodiment in which ozone density in the cooling water is monitored and forced ventilation is terminated or decelerated in accordance with the obtained value, it is also possible to terminate or decelerate the ventilation in the cooling tower during the injection of ozone or during a specified period thereafter.

While it has been explained for a case in this embodiment in which ozone density in the cooling water is monitored, it is also possible to monitor an ozone density in the air flowing through the cooling tower.

Embodiment 3

Figure 3:
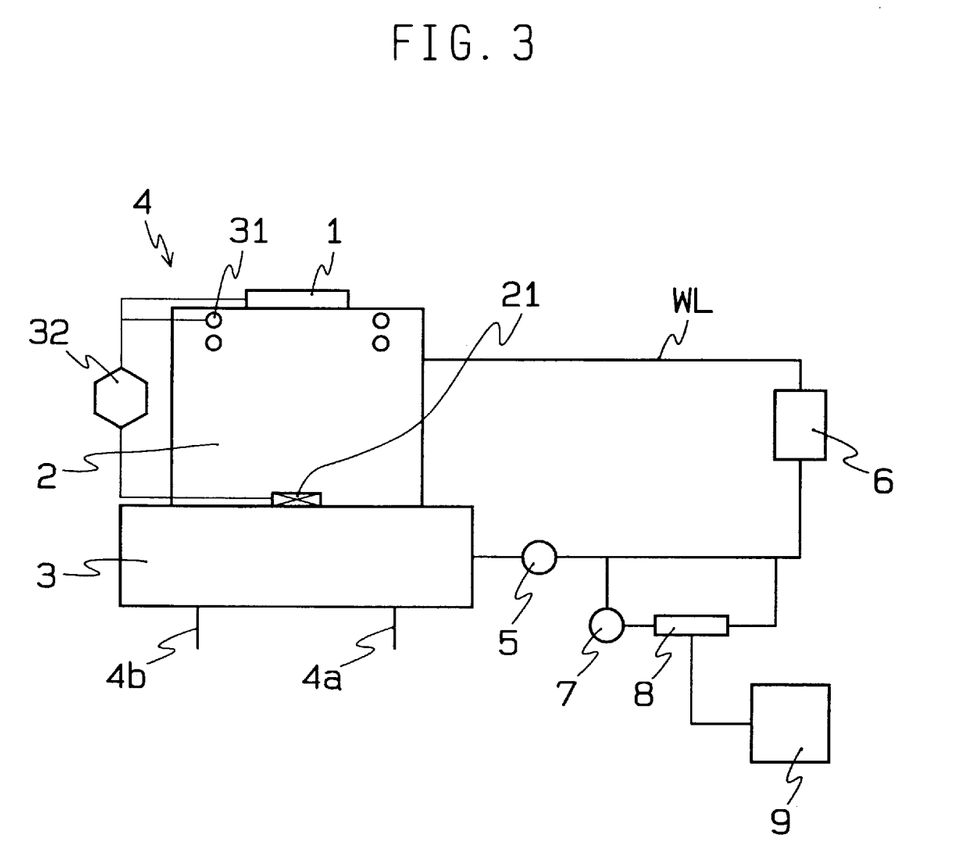
FIG. 3 is a diagram showing an arrangement of an apparatus for preventing biofouling in a cooling water system according to Embodiment 3 of the present invention.
Figure 4:
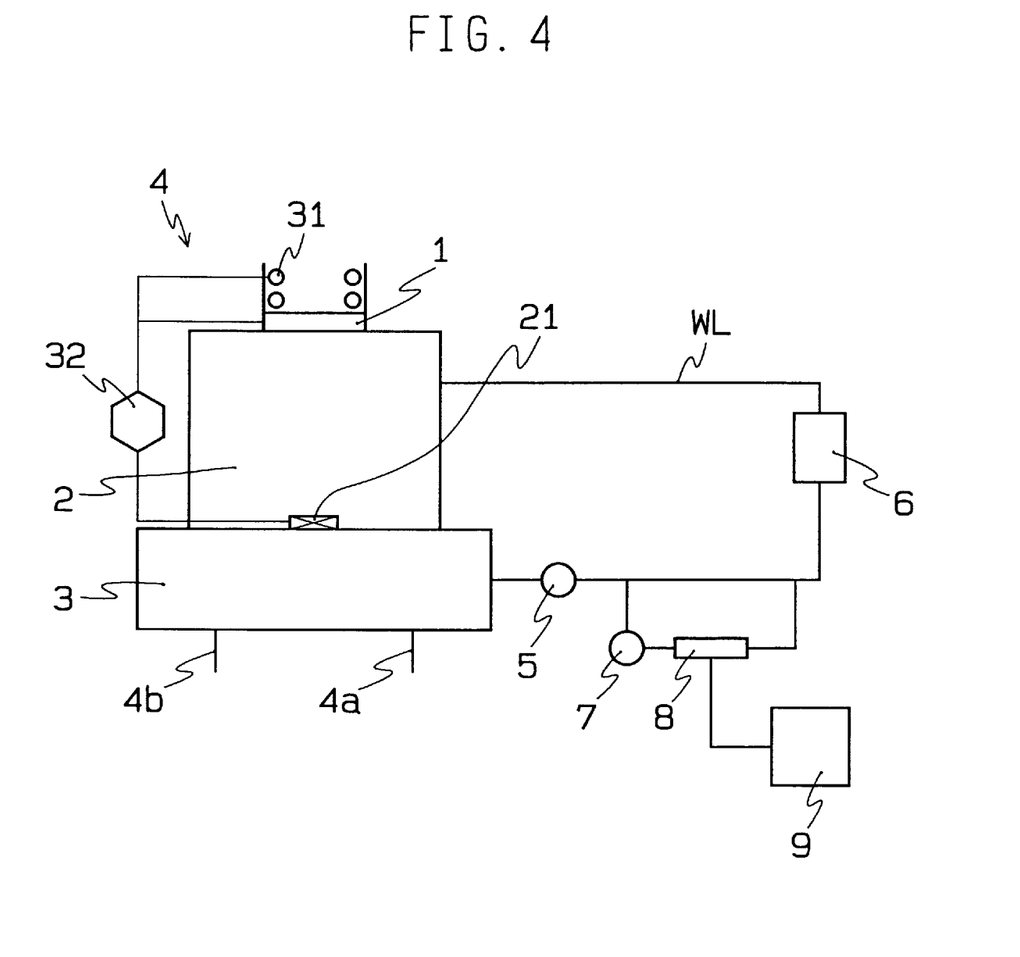
FIG. 4 is a diagram showing an arrangement of an another apparatus for preventing biofouling in a cooling water system according to Embodiment 3 of the present invention.

FIG. 3 is a diagram showing an arrangement of a biofouling preventing apparatus for a cooling water system according to Embodiment 3 of the present invention, and since numerals which are identical with those of the previous embodiments indicate identical or equivalent portions, explanations thereof will be omitted.

Numeral 31 denotes an ultraviolet light irradiating device for irradiating ultraviolet light for decomposing ozone in air flowing through cooling tower 4, and which constitutes, together with the ozone densitometer 21 and a control device 32 for controlling the ultraviolet light irradiating device 31, an ultraviolet light irradiating means.

Operations will now be explained. There are three operations in total, namely ozone adsorbing operation, ozone desorbing operation, and biofouling removal operation. However, since the ozone adsorbing operation and the ozone desorbing operation are identical with those of Embodiment 1, explanations thereof will be omitted.

When the stored ozone is intermittently injected to a branching line provided amid a piping extending from the reservoir 3 of the cooling tower 4 to the heat exchanger 6 in the ozone reservoir 9 (refer to FIG. 1), ozone is supplied to the filling material of the fillers 2, heat exchanger surface and other channel walls, whereby removal of living things adhering to their surfaces is performed. At this time, the ozone density in the cooling water is monitored by the ozone densitometer 21 at an outlet of the fillers 2 of the cooling tower 4. When the ozone density is not less than a predetermined value, a signal is sent from the ozone densitometer 21 to the control device 32, and the control device 32 sends a signal to the ultraviolet light irradiating device 31 for starting irradiation of ultraviolet light.

On adsorbing ultraviolet light, ozone is instantly decomposed, and further, in the presence of moisture, ozone might be decomposed at a high quantum efficiency as shown by the following equation so that it is possible to easily and economically decompose ozone with an ultraviolet light lamp of relatively small capacity. It should be noted that by disposing the ultraviolet light lamp at a position where it does not directly contact or it slightly contact with ventilation air, stains formed on the lamp surface can be lessened.

$O_3$+ultraviolet light→$O_2$+O

O+$H_2O$→2OH

OH+$O_3$→$HO_2$+$O_2$ $HO_2$+$O_3$→OH+$2O_2$

With this arrangement, dissolved ozone in the cooling water can be prevented from being diffused into air, and a safe biofouling preventing apparatus for a cooling water system can be obtained.

While the presence/absence of control for force ventilation has not been discussed in this embodiment, almost the same effects can be obtained with or without performing any control, since decomposition of ozone through ultraviolet light is performed very quickly.

Further, while the present embodiment has been explained by taking a case in which the ultraviolet light irradiating device 31 is disposed at the inlet of the ventilating fan 1 of the cooling tower 4, the same effects can be obtained by disposing the ultraviolet light irradiating device 31 at the outlet of the ventilating fan 1 of the cooling tower 4 wherein ozone is decomposed by operating the ventilating fan 1 of the cooling tower 4.

As discussed so far, according to the first invention, ozone of high density is intermittently injected into a circulating line of a cooling water system in which cooling water is made to circulate in a closed system which includes a cooling tower and a heat exchanger, whereby biofoulings can be economically and reliably prevented. Further, there can also be achieved effects that the amount of ozone used for performing biofouling prevention is decreased and that the performance of the ozone generator which the apparatus is furnished with can be decreased.

According to the second invention, an interval and time for injecting ozone are not more than twice a day and not more than 5 minutes respectively, and an average value of dissolved ozone density in the cooling water of the cooling water system during injection is not less than approximately 0.1 mg/liter, desirably not less than 0.2 mg/liter, whereby the amount of ozone used for performing biofouling prevention can be decreased.

According to the third invention, the apparatus is so arranged as to comprise an ozone generator for producing ozone from raw material gas, an ozone reservoir for temporarily storing the produced ozone, and an ozone injector for injecting the stored ozone into a circulating line of a cooling water system in which cooling water is made to circulate in a closed system which includes a cooling tower and a heat exchanger, whereby the amount of ozone used for performing biofouling prevention can be decreased and the performance of the ozone generator which the apparatus is furnished with can be decreased.

According to the fourth invention, the ozone reservoir comprises an adsorption/desorption device for adsorbing and storing ozone from ozonized oxygen and further desorbing the ozone, and a circulating blower for returning oxygen which has been adsorbed of ozone by the adsorption/desorption device to the ozone generator, whereby the amount of ozone used for performing biofouling prevention can be decreased and the performance of the ozone generator which the apparatus is furnished with can be decreased.

According to the fifth invention, the apparatus includes a ventilation amount control device for terminating or decelerating forced ventilation of the cooling tower during a period in which ozone is injected and in which the dissolved ozone density in the cooling water is not less than a predetermined value, whereby the diffusion of ozone into air can be minimized, and ozone can be effectively utilized.

According to the sixth invention, the apparatus includes an ultraviolet light irradiating device for irradiating ultraviolet light to the exhausted air from the cooling tower during a period in which ozone is injected and in which the dissolved ozone density in the cooling water is not less than a predetermined value, whereby the diffusion of ozone into air can be minimized, and ozone can be effectively utilized.

What is claimed is:

1. An apparatus for preventing biofouling in a cooling water system, comprising:

an ozone generator configured to produce ozone from raw material gas;

an ozone reservoir configured to temporarily store the ozone produced by said ozone generator;

an ozone injector configured to inject the ozone stored in said ozone reservoir into a circulating line of the cooling water system in which cooling water is circulated in a closed system which includes a cooling tower and a heat exchanger; and a ventilation amount controller configured to terminate or decelerate ventilation of the cooling tower during a period in which the ozone is injected and in which dissolved ozone density in the cooling water is more than a predetermined value.

2. The apparatus of claim 1, further comprising:

an ultraviolet light irradiating device configured to irradiate ultraviolet light to air exhausted from the cooling tower during the period in which the ozone is injected and in which the dissolved ozone density in the cooling water is more than the predetermined value.

3. An apparatus for preventing biofouling in a cooling water system, comprising:

an ozone generator configured to produce ozone from oxygen;

an ozone reservoir including an adsorption/desorption device and a circulating blower, the adsorption/desorption device being configured to adsorb and temporarily store the ozone in a mixture of the oxygen and the ozone produced by said ozone generator and further configured to desorb the ozone, the circulating blower being configured to return the oxygen in the mixture, which is not adsorbed by the adsorption/desorption device, to the ozone generator;

an ozone injector configured to inject the ozone stored in said ozone reservoir into a circulating line of the cooling water system in which cooling water is circulated in a closed system which includes a cooling tower and a heat exchanger; and a ventilation amount controller configured to terminate or decelerate ventilation of the cooling tower during a period in which the ozone is injected and in which dissolved ozone density in the cooling water is more than a predetermined value.

4. The apparatus of claim 3, further comprising:

an ultraviolet light irradiating device configured to irradiate ultraviolet light to air exhausted from the cooling tower during the period in which the ozone is injected and in which the dissolved ozone density in the cooling water is more than the predetermined value.

5. A method for preventing biofouling in a cooling water system, comprising:

storing ozone in an ozone reservoir temporarily;

injecting the ozone stored in the ozone reservoir into a circulating line of the cooling water system in which cooling water is circulated in a closed system which includes a cooling tower and a heat exchanger; and controlling ventilation of the cooling tower to be terminated or decelerated during a period in which the ozone is injected and in which dissolved ozone density in the cooling water is more than a predetermined value.

6. The method of claim 5, wherein the ozone is injected not more than twice a day and not more than for 5 minutes per injection, and wherein an average value of the dissolved ozone density in the cooling water of the cooling water system during injection is not less than approximately 0.1 mg/liter.

* * * * *